No. 865,931. PATENTED SEPT. 10, 1907.
S. T. PARK.
DRAFT OR WORK INDICATING AND RECORDING MECHANISM
FOR LOCOMOTIVES.
APPLICATION FILED MAY 31, 1906.

Witnesses:
Wm. Geiger
H. W. Munday

Inventor:
Samuel T. Park
By Munday, Evarts & Adcock.
Attorneys

No. 865,931. PATENTED SEPT. 10, 1907.
S. T. PARK.
DRAFT OR WORK INDICATING AND RECORDING MECHANISM
FOR LOCOMOTIVES.
APPLICATION FILED MAY 31, 1906.

Witnesses:
Wm. Geiger
H. M. Munday

Inventor:
Samuel T. Park
By Munday Evarts & Adcock.
Attorneys

No. 865,931. PATENTED SEPT. 10, 1907.
S. T. PARK.
DRAFT OR WORK INDICATING AND RECORDING MECHANISM
FOR LOCOMOTIVES.
APPLICATION FILED MAY 31, 1906.

Witnesses:
Wm. Geiger

Inventor:
Samuel T. Park
By Munday, Evarts & Adcock
Attorneys

No. 865,931. PATENTED SEPT. 10, 1907.
S. T. PARK.
DRAFT OR WORK INDICATING AND RECORDING MECHANISM
FOR LOCOMOTIVES.
APPLICATION FILED MAY 31, 1906.
10 SHEETS—SHEET 5.

Fig. 6

Witnesses:
Wm. Geiger
N. W. Munday,

Inventor:
Samuel T. Park
By Munday, Evarts & Adcock.
Attorneys

No. 865,931.

PATENTED SEPT. 10, 1907.

S. T. PARK.

DRAFT OR WORK INDICATING AND RECORDING MECHANISM FOR LOCOMOTIVES.

APPLICATION FILED MAY 31, 1906.

Witnesses:
Wm. Geiger
H. W. Munday

Inventor:
Samuel T. Park.
By Munday, Evarts & Adcock.
Attorneys

No. 865,931. PATENTED SEPT. 10, 1907.
S. T. PARK.
DRAFT OR WORK INDICATING AND RECORDING MECHANISM
FOR LOCOMOTIVES.
APPLICATION FILED MAY 31, 1906.

Witnesses:
Wm. Geiger

Inventor:
Samuel T. Park
By Munday Evarts & Adcock
Attorneys

No. 865,931. PATENTED SEPT. 10, 1907.
S. T. PARK.
DRAFT OR WORK INDICATING AND RECORDING MECHANISM
FOR LOCOMOTIVES.
APPLICATION FILED MAY 31, 1906.

Witnesses:
Wm. Geiger
H. W. Munday

Inventor:
Samuel T. Park
By Munday Evarts & Adcock.
Attorneys

No. 865,931. PATENTED SEPT. 10, 1907.
S. T. PARK.
DRAFT OR WORK INDICATING AND RECORDING MECHANISM
FOR LOCOMOTIVES.
APPLICATION FILED MAY 31, 1906.
10 SHEETS—SHEET 9.

Fig. 10

Witnesses:
Wm. Geiger
H. W. Munday

Inventor:
Samuel T. Park
By Munday, Evarts & Adcock
Attorneys

No. 865,931. PATENTED SEPT. 10, 1907.
S. T. PARK.
DRAFT OR WORK INDICATING AND RECORDING MECHANISM
FOR LOCOMOTIVES.
APPLICATION FILED MAY 31, 1906.

Witnesses
Wm. Geiger

Inventor:
Samuel T. Park
By Munday, Evarts & Adcock.
Attorneys

UNITED STATES PATENT OFFICE.

SAMUEL T. PARK, OF DANVILLE, ILLINOIS, ASSIGNOR TO HIMSELF AND JOHN E. PHILLIPS, OF DANVILLE, ILLINOIS.

DRAFT OR WORK INDICATING AND RECORDING MECHANISM FOR LOCOMOTIVES.

No. 865,931.　　　　　　Specification of Letters Patent.　　　　　Patented Sept. 10, 1907.

Application filed May 31, 1906. Serial No. 319,478.

*To all whom it may concern:*

Be it known that I, SAMUEL T. PARK, a citizen of the United States, residing in Danville, in the county of Vermilion and State of Illinois, have invented a new, and useful Improvement in Draft or Work Indicating and Recording Mechanism for Locomotives or other Traction-Motors, of which the following is a specification.

My invention relates to improvements in mechanism for indicating and recording the draft or work done by locomotives or other traction motors, and more particularly to improvements upon the draft indicating mechanism of the J. E. Phillips patent No. 428,179 of May 20th, 1890.

The object of my invention is to provide a draft or work indicating and recording mechanism for use upon locomotives or other traction motors which will be of a simple, efficient and durable construction, capable of being easily and conveniently applied, and which will not only indicate to the engineer or driver the draft or load upon the locomotive, the speed of the train and the work it is doing from time to time, but which will also automatically record in a permanent record of convenient form, the performance of the locomotive during the whole time of its trip from beginning to end, so that the proper officers of the railroad may have all the data necessary for ascertaining or figuring out the work done by the locomotive and its cost either in terms of power exerted, or coal consumed in respect to train or freight load hauled and its speed, or in any other convenient terms or factors.

My invention consists in the means I employ to practically accomplish this object or result. That is to say, it consists in connection with the draw-bar of the locomotive or its tender, of a fluid containing cylinder and piston interposed between them, a pressure gage indicating the pressure upon the fluid and thereby the load or tractive pull of the train, and having a stationary graduated dial on the gage for indicating the tonnage of the train or freight load in train tons, and provided with a movable indicating finger actuated by the fluid cylinder and piston, a movable record sheet, a clock mechanism for actuating the record sheet, and a movable recording arm actuated by the fluid cylinder and piston, whereby in connection with the tons of revenue or paying freight upon the train and the amount of coal consumed on any trip or haul, the complete work done by the locomotive during the whole time it is in use on any trip or haul may be automatically recorded in permanent form, so that the actual cost of hauling the freight in tons per mile may be readily arrived at. In my invention, all the necessary factors are automatically recorded upon the record sheet which are required to enable any desired data to be ascertained.

My invention also consists in the novel construction of parts and devices and in the novel combinations of parts and devices herein shown or described.

In the accompanying drawing forming a part of this specification.

In the drawing, A represents a locomotive or a portion thereof, $A^1$ its tender and $A^2$ the draw-bar, (preferably the draw-bar at the rear end of the tender which connects the locomotive with the train) to which draw bar the mechanism of my invention is directly connected.

B is the fluid cylinder and $B^1$ the piston which are interposed between the draw-bar and the tender or locomotive to which the draw-bar is connected.

The piston $B^1$ of the fluid cylinder B is preferably connected to the draw-bar by a cross-bar C, connecting rods $C^1$ and cross bar $C^3$, the cross bar C being connected to the draw-bar by a pin $C^4$ and the cross bar $C^3$ being connected to the piston $B^1$ by a pin $C^5$.

D is a pressure gage, the same being of any suitable or desired construction. It is connected by a pipe $D^1$ with the fluid pressure cylinder B, the gage being preferably located in the locomotive cab in convenient position for observation by the engineer.

The pressure gage D is furnished with a stationary dial $D^2$ graduated preferably to indicate freight load in train tons. The pressure gage D may be of any suitable or well known construction, but it preferably consists essentially of a hollow tubular spring arm $d$ communicating with the pipe $D^1$, so that the pressure of the fluid tends to straighten out the hollow curved arm $d$. The free end of the hollow, curved, tubular arm $d$ is connected by a link $d^1$, toothed segment $d^2$ and gear $d^3$ with the sleeve or hollow shaft $d^4$ of the pressure indicator hand E, so that the pressure indicator hand is caused to rotate around the dial $D^2$ as the fluid pressure in the cylinder B varies with the load or pull of the train.

F is a clock mechanism of any well known or suitable construction and $F^1$ is a shaft connected with and driven by the clock mechanism, furnished with clamps or holders $f f^1$ for receiving and supporting a movable record sheet G, preferably of paper, which is moved or rotated by the clock mechanism.

H is a recording arm having a recording marker $h$, such as a pen or pencil, adapted to make a mark or record upon the movable recording sheet G as the same is moved or rotated continuously by the clock mechanism. The recording arm H is pivoted to the stationary dial at $h^1$ and is connected by a lever $h^2$ and links $h^3$ $h^4$ with the hollow curved pressure gage $d$, so that the fluid pressure exerted by the train or locomotive upon the fluid cylinder and piston B $B^1$ will be communicated to the recording arm H. The movable record sheet G may be of any suitable form adapted to be operated by the clock mechanism, and coöperate with the movable recording arm H and the fluid cylinder and piston which actuate the same. I prefer, however, to make it in the form of a circular disk, and I preferably graduate it with suitable graduations and figures to indicate directly thereon the desired factors or data registered by the recording arm. If, however, a plain recording sheet is employed having no figures or graduations thereon, the record made by the recording arm and its marker may be read by placing the record sheet in juxtaposition with a suitable graduated reading plate having the necessary graduations and figures thereon.

Figure 1:
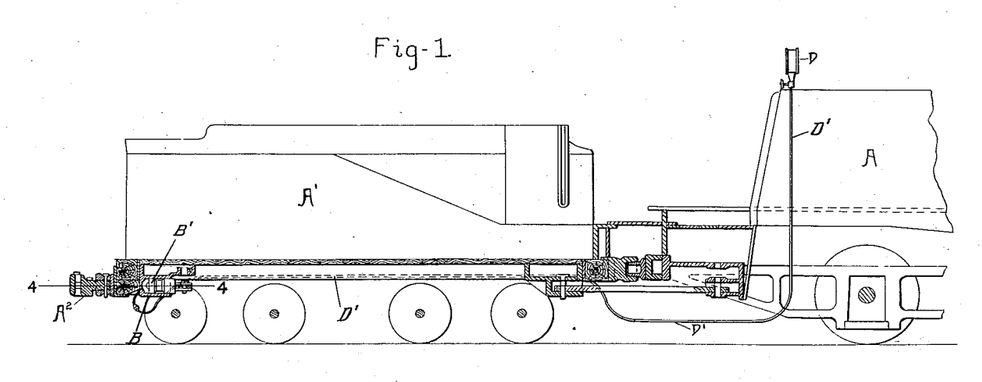
Figure 1 is a side elevation partly in central vertical section of an automatic draft or work indicating and recording mechanism embodying my invention as applied to an ordinary locomotive and tender.
Figure 2:
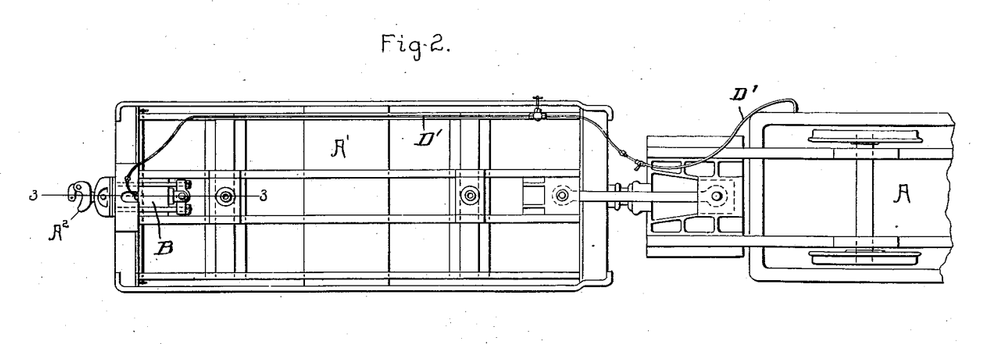
Fig. 2 is a plan view.
Figure 3:
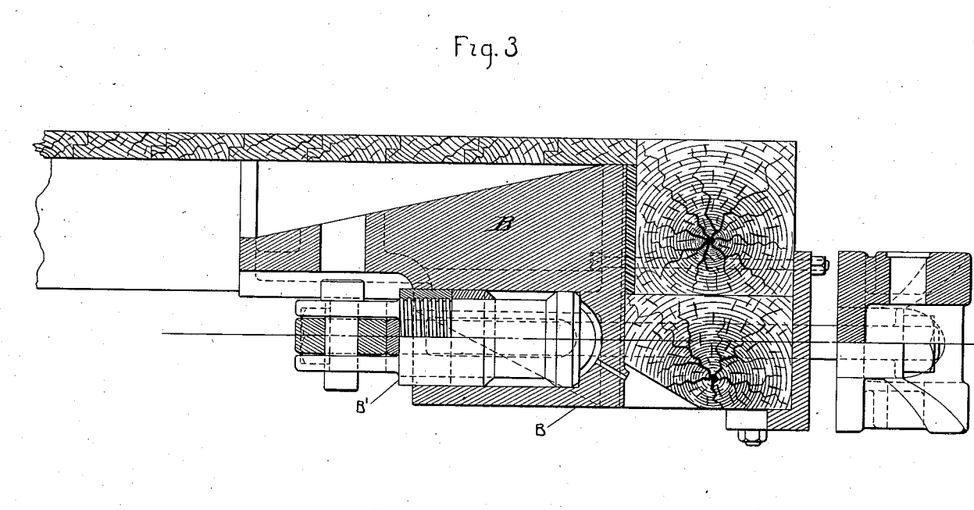
Fig. 3 is a central vertical section on line 3—3 of Fig. 2.
Figure 4:
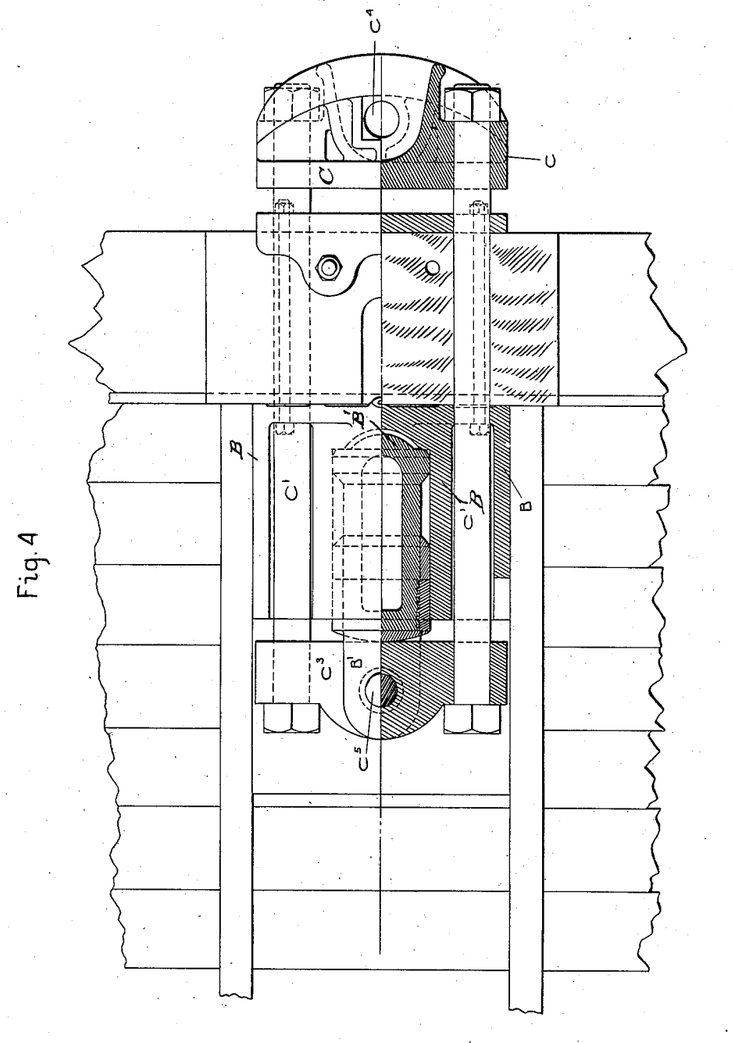
Fig. 4 is an enlarged plan view partly in horizontal section on line 4—4 of Fig. 1.
Figure 5:
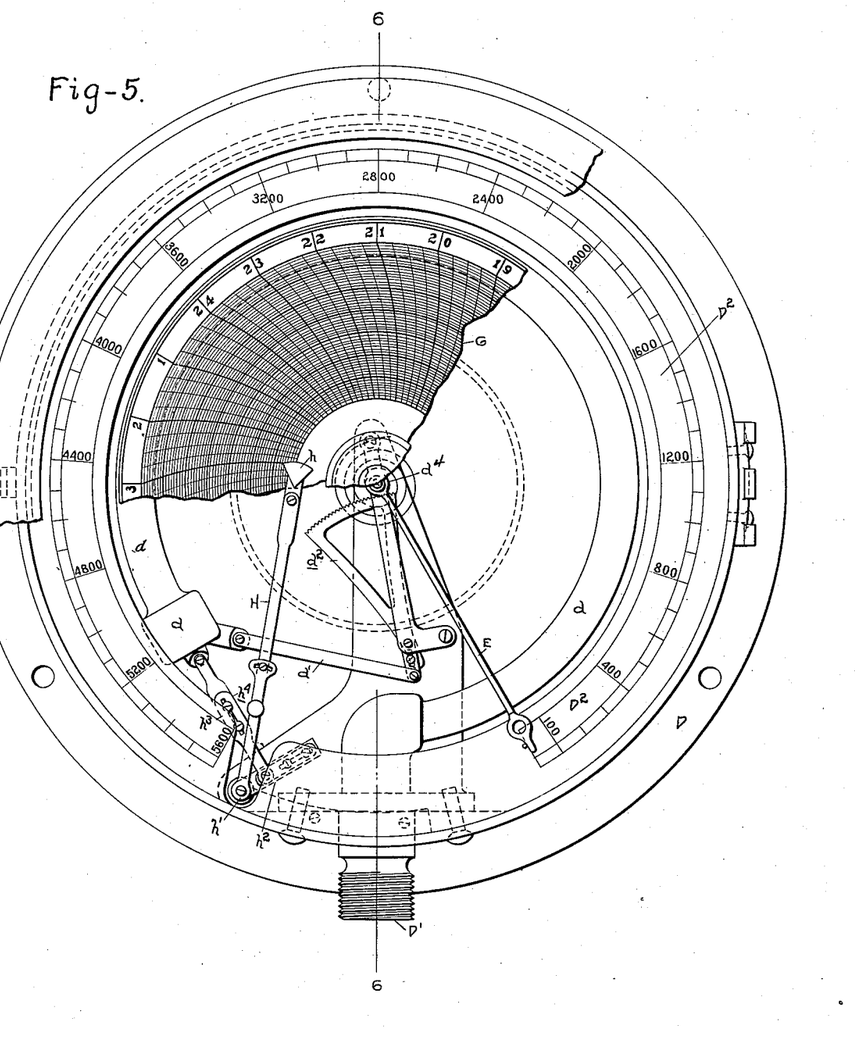
Fig. 5 is an enlarged detail front elevation of the indicating and recording mechanism.
Figure 6:
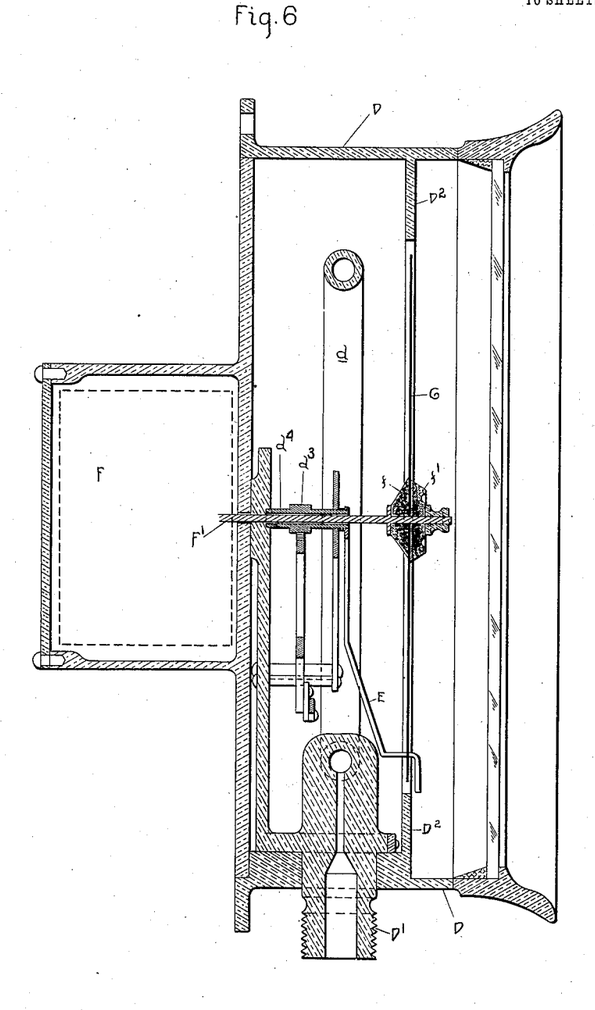
Fig. 6 is a vertical section on line 6—6 of Fig. 5, the clock mechanism being simply conventionally indicated by a rectangular dotted line.
Figure 7:
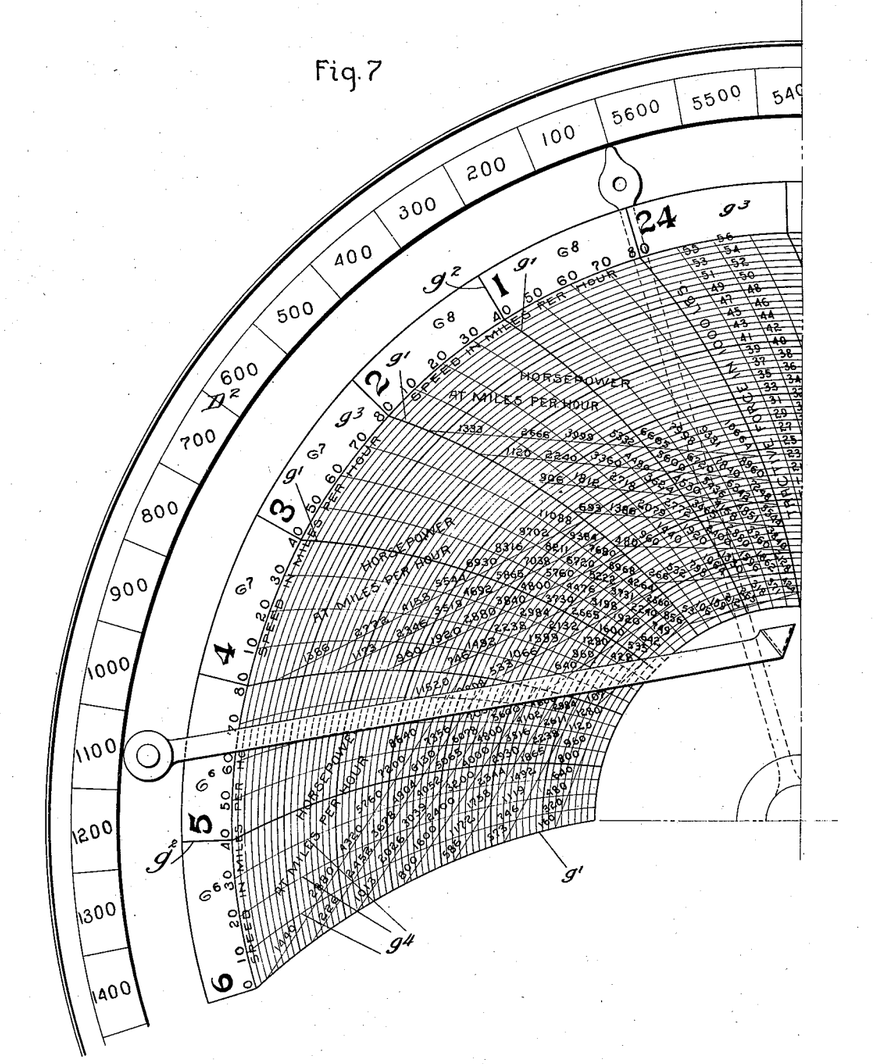
Figs. 7 and 8 taken together indicate one half of the stationary dial and one half of the graduated record sheet.
Figure 8:
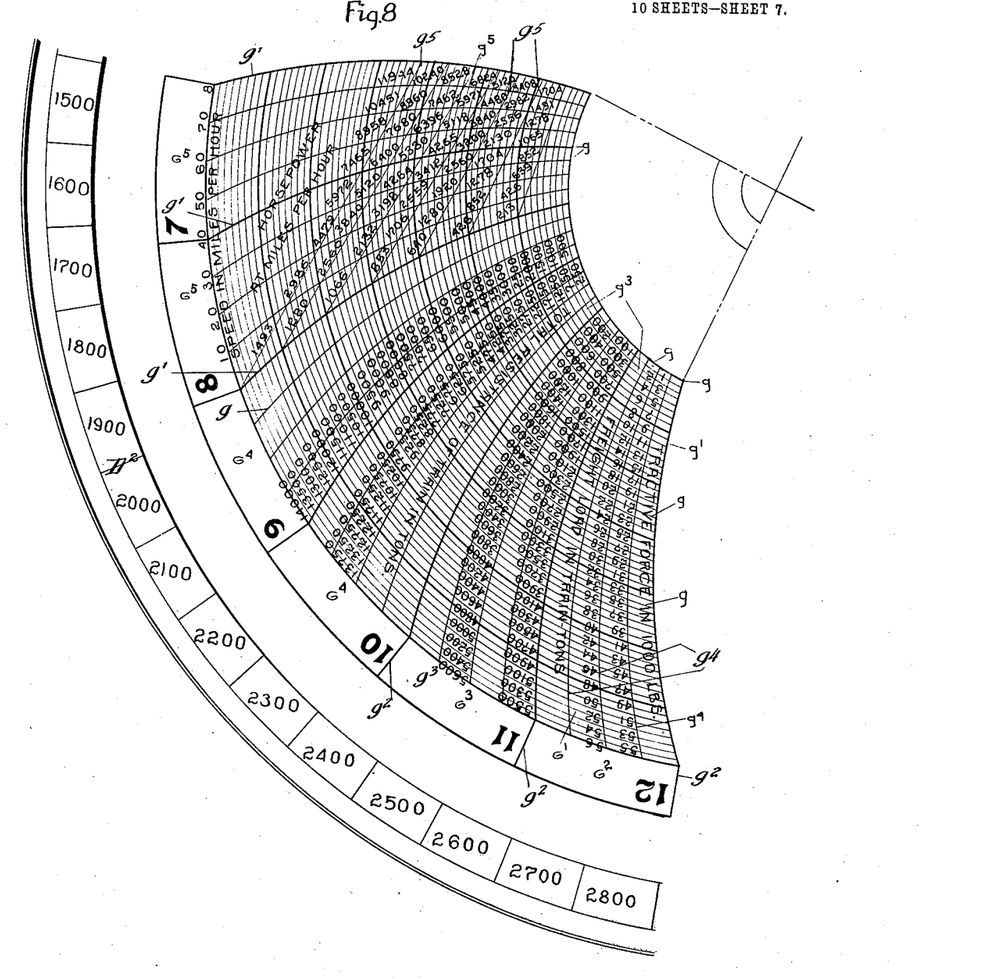

The preferred construction of record sheet and of graduations thereon are illustrated in Figs. 7 and 8 of the drawing. As illustrated in these figures, which show one half of the entire record sheet, (the drawings being necessarily enlarged in order to clearly illustrate the graduations and figures or markings,) the marking or graduations upon the record sheet preferably comprise a series of circular lines $g$, every eighth line of which is preferably made heavier to facilitate the reading of the record by tracing the line indicated by the marker $h$ of the recording arm H.

The space occupied by the circular lines $g$ is that in which the record to be preserved is kept, and will hereinafter be referred to as the "record-space". This record-space is divided up into twenty-four equal sections by equi-distant curved coördinates $g^1$, which extend from the inner end of the graduates $g^2$ dividing the annulus $g^3$ into horological spaces, to the innermost line of the recording space, in a circular curve struck from the axis of the indicator-hand E of the pressure-gage D, which if continued would intersect the center of the record sheet G. The time required for any part of any of these twenty-four sections to pass a given stationary point is one hour, and I prefer to divide each of said sections, by lighter bicircular coördinates $g^4$, into spaces representing fifteen minutes or one-fourth of an hour, and the fifteen minutes spaces may, if desired, again be divided into smaller fractions representing minutes.

The section $G^1$ of the record-space, the outer end of which coincides with the horological space marked $G^2$, is indicated by the legend "Tractive force in 1000 lbs.", the next section $G^3$ to the left is indicated by the legend "Freight load in train tons", and the next two sections $G^4$ to the left by the legend "Total resistance of train in tons". The next two sections $G^5$ $G^5$, whose outer ends coincide with the horological spaces 7 and 8 are indicated by the legend "Speed in miles per hour", and likewise by the words "Horse power at miles per hour", and each succeeding pair of sections $G^6$ $G^6$ and $G^7$ $G^7$ and $G^8$ $G^8$ in the coupled order designated are indicated in like manner by said words. The sections hereinbefore referred to cover one-half of the record-space, and this order of indicating is repeated in the remaining sections which occupy the remaining half, (not shown) of said record-space, and have their outer ends coincide in position with the horological spaces marked respectively with the numerals 13 to 24 inclusive. In section $G^1$ the circular lines $g$ are numbered, commencing with the innermost to the outermost, from 1 to 56 inclusive; but in order to economize room the numerals designating the even numbered lines are arranged in one column, and the numerals designating the odd numbered lines in another column, substantially as shown. In section $G^3$, in which the freight loads in train-tons are to be indicated, the lines commencing with the innermost, are designated with the numeral 100 and progress to 5600 for the outermost, one hundred tons representing the smallest train load and fifty-six hundred the maximum. These numerals are placed or printed over the lines, and the odd numerals are arranged in one column and the even numerals in another column. In section $G^4$ the innermost circular line is designated by the numerals "250" and the outer one "14000", and the numerals ending with the figures "250", or "750", are arranged in one column, and those ending with the figures 500 are arranged in another column.

The sections $G^5$ $G^6$ $G^6$ $G^6$, $G^7$ $G^7$ and $G^8$ $G^8$ each have tables of suitable disposed figures to indicate the horse power at miles per hour, and these figures are arranged so that allowance will be made for the fact that a greater tractive force is required to overcome the resistance of the train when it is at a standstill than when it is in motion. When the standing resistance has been overcome, this tractive force is reduced, in draft and consumed in velocity. The starting resistance of the train being known and the resistance of the same while traveling at a given velocity, the lesser velocities can be marked and noted by the readings on record G, due to the falling of the indicator-hand E. These readings are easily ascertained by tracing the tangentially disposed lines $g^5$ $g^5$ to where they intersect lines $g$ $g$. The speed in miles per hour being known by the bicircular coördinates $g^1$, and the tractive force exerted being also known, the horse power in lines $g^5$ is easily ascertainable.

Figure 9:
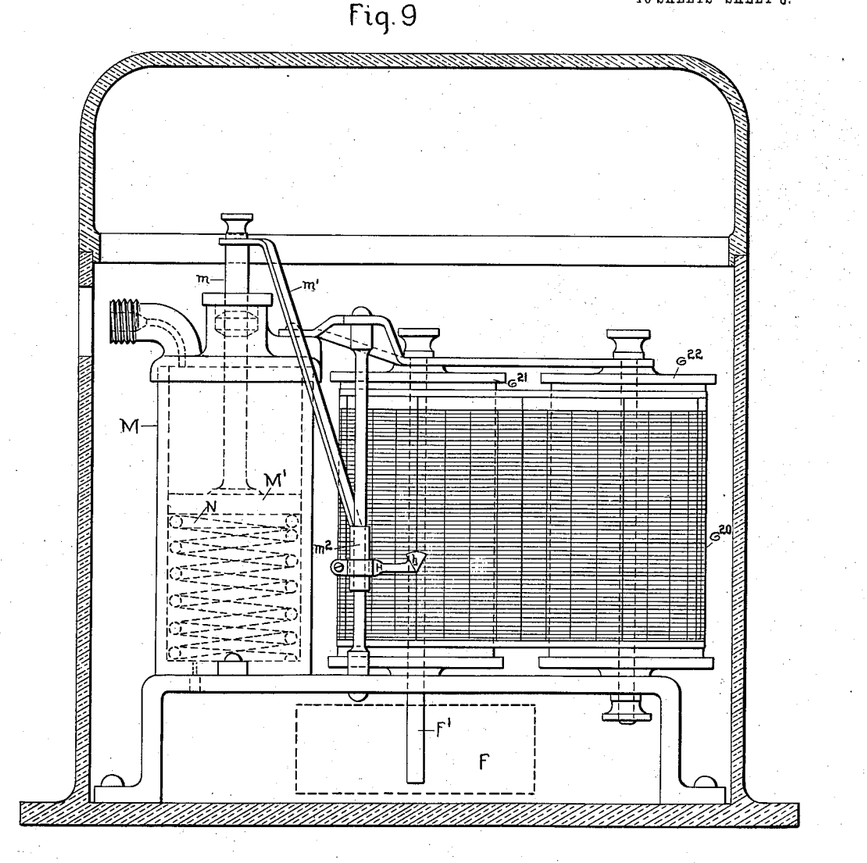
Fig. 9 is a side elevation partly in central vertical section illustrating a modification in which a ribbon record sheet is employed in place of the circular record disk illustrated in the previous figures.
Figure 10:
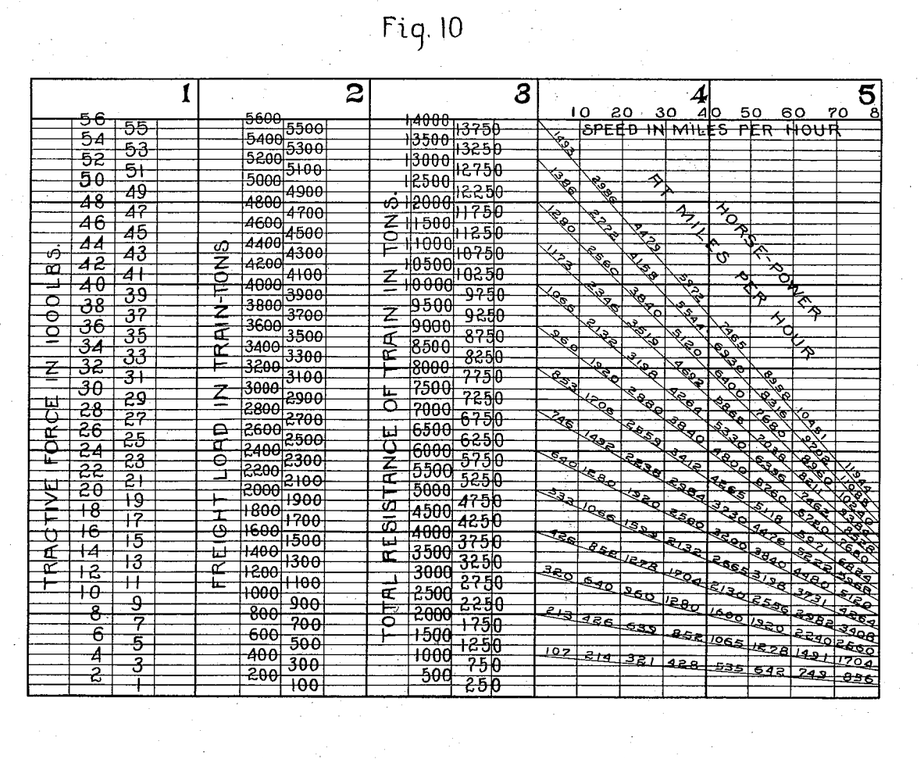
Figs. 10 and 11 are views illustrating the graduations upon the record ribbon illustrated in Fig. 9.
Figure 11:
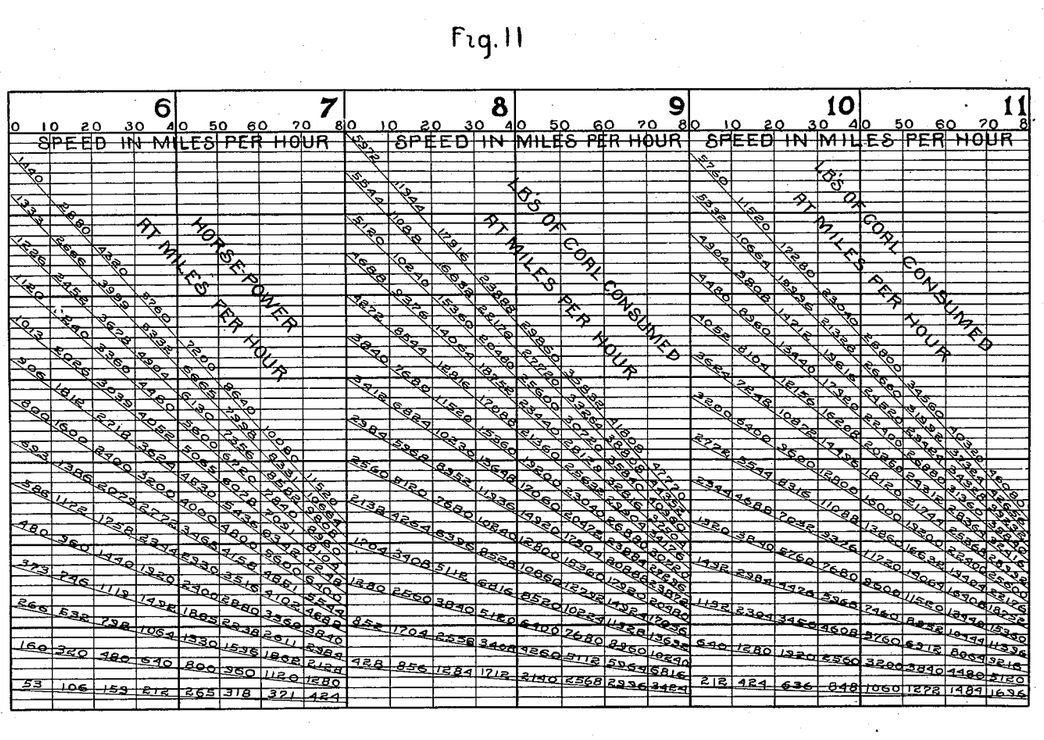

In the modification illustrated in Figs. 9, 10 and 11, a different construction of pressure gage is shown and the movable record sheet is in the form of a ribbon $G^{20}$, instead of a circular disk. In this modification, the graduations and markings upon the ribbon are substantially the same as upon the disk and need no further description. The ribbon record sheet $G^{20}$ is mounted upon spools or drums $G^{21}$ $G^{22}$, one of which is connected with the shaft $F^1$, which is driven by the clock F. In this modification, the gage comprises a cylinder M and piston $M^1$, the cylinder containing a spring N, and the piston having a stem $m$, which is connected by a rod $m^1$ with a slide $m^2$ carrying the movable recording arm H having the marker $h$.

I claim:—

1. The automatic draft or work indicating and recording mechanism for locomotives or other traction motors, consisting in the combination with the draw-bar, of a fluid pressure cylinder and piston interposed between the draw-bar and the locomotive or tender to which the draw-bar is attached and connected thereto respectively, a pressure gage, a pipe connecting the pressure gage with said fluid pressure cylinder, a movable recording arm connected with and actuated by the pressure gage, a clock mechanism, and a movable holder for a record sheet actuated by the clock mechanism, an indicator hand connected with and actuated by said pressure gage and a stationary dial, substantially as specified.

2. The combination with a draw-bar, of a fluid pressure cylinder and piston interposed between the draw-bar and the device to which the draw-bar is attached and connected thereto respectively, a pressure gage communicating with said fluid cylinder, a clock mechanism, a movable holder for a record sheet actuated by said clock mechanism, and a recording arm connected with and actuated by the pressure gage, substantially as specified.

3. The combination with a draw-bar of a locomotive or its tender, of a fluid pressure cylinder and piston interposed between the draw-bar and the locomotive or tender to which the draw-bar is attached and connected thereto respectively, a pressure gage communicating with said fluid cylinder, a clock mechanism, a movable holder for a record sheet actuated by said clock mechanism, and a recording arm connected with and actuated by the pressure gage, whereby upon a record sheet being provided with graduations and indicating figures the work done by the locomotive during a trip may be indicated and recorded, substantially as specified.

4. The combination with a draw-bar of a locomotive or its tender, of a fluid pressure cylinder and piston interposed between the draw-bar and the locomotive or tender to which the draw-bar is attached and connected thereto respectively, a pressure gage communicating with said fluid cylinder, a clock mechanism, a movable holder for a record sheet actuated by said clock mechanism, a recording arm connected with and actuated by the pressure gage, a stationary dial and an indicator hand connected with and actuated by the pressure gage, substantially as specified.

5. The combination with a draw-bar of a locomotive or its tender, of a fluid pressure cylinder and piston interposed between the draw-bar and the locomotive or tender to which the draw-bar is attached and connected thereto respectively, a pressure gage communicating with said fluid cylinder, a clock mechanism, a movable holder for a record sheet actuated by said clock mechanism, a recording arm connected with and actuated by the pressure gage, whereby upon a movable record sheet being furnished with a graduated annulus indicating hours and an annular record space furnished with a series of circular graduations and also a series of curved coördinate graduations the work done by the locomotive during a trip may be indicated and recorded, substantially as specified.

6. The automatic draft and work indicating and recording mechanism for locomotives or other traction motors, consisting in the combination with the draw bar, of a fluid pressure cylinder and piston interposed between the draw bar and the locomotive or tender to which the draw bar is attached, means connecting said cylinder with the locomotive or its tender, means connecting said piston with said draw bar, a pressure gage, a pipe connecting the pressure gage with said fluid pressure cylinder, a movable recording arm connected with and actuated by the pressure gage, a clock mechanism, and a movable holder for a record sheet actuated by the clock mechanism, an indicator hand connected with and actuated by said pressure gage and a stationary dial, substantially as specified.

7. The combination with a draw bar, of a fluid pressure cylinder and piston interposed between the draw bar and the device to which the draw bar is attached, cross bars and links connecting said piston with the draw bar, a pressure gage communicating with said fluid cylinder, a clock mechanism, a movable holder for a record sheet actuated by said clock mechanism, and a recording arm connected with and actuated by the pressure gage, substantially as specified.

8. The combination with a draw bar and a locomotive or other motor, of a fluid pressure cylinder connected to said locomotive or motor, of a piston working in said cylinder and connected to the draw bar, a pressure gage communicating with said fluid cylinder, a clock mechanism, a movable holder for a record sheet actuated by said clock mechanism, and a recording arm connected with and actuated by the pressure gage, substantially as specified.

SAMUEL T. PARK.

Witnesses:
H. M. MUNDAY,
J. E. PHILLIPS.